US008678412B1

(12) United States Patent
Oliveras, Jr. et al.

(10) Patent No.: US 8,678,412 B1
(45) Date of Patent: Mar. 25, 2014

(54) LOW-RIDER TRICYCLE KIT

(76) Inventors: Daniel Oliveras, Jr., Aumsville, OR (US); Jesse Oliveras, Aumsville, OR (US)

(*) Notice: Subject to any disclaimer, the term of this patent is extended or adjusted under 35 U.S.C. 154(b) by 73 days.

(21) Appl. No.: 13/348,922

(22) Filed: Jan. 12, 2012

(51) Int. Cl.
*B62M 9/04* (2006.01)

(52) U.S. Cl.
USPC .............................. 280/210; 280/282; 280/62

(58) Field of Classification Search
USPC ........... 280/282, 278, 279, 287, 638, 657, 62, 280/47.371, 47.315, 655.1; 297/195.1, 297/215.14, 215.13; 403/322.2, 325, 377, 403/109.3; D12/112
See application file for complete search history.

(56) References Cited

U.S. PATENT DOCUMENTS

| | | | |
|---|---|---|---|
| D149,193 S | 4/1948 | Larralde | |
| 2,550,876 A | 5/1951 | Spencer | |
| 3,063,735 A | 11/1962 | Faurie | |
| D200,040 S | 1/1965 | Brown | |
| 3,694,004 A | 9/1972 | Siebers | |
| D236,803 S | 9/1975 | Ennis | |
| 3,913,946 A * | 10/1975 | Valentine et al. | 280/236 |
| 4,152,005 A * | 5/1979 | Vanore | 280/234 |
| 4,191,269 A * | 3/1980 | Nagashima et al. | 180/217 |
| 4,313,517 A * | 2/1982 | Pivar | 180/216 |
| 4,546,992 A * | 10/1985 | Swartz et al. | 280/282 |
| 4,597,466 A * | 7/1986 | Yamada | 180/225 |
| D308,499 S | 6/1990 | Berger | |
| 5,267,744 A * | 12/1993 | Berry et al. | 280/204 |
| 5,876,047 A * | 3/1999 | Dennis | 280/47.35 |
| 5,992,870 A | 11/1999 | LaRiviere | |
| D600,596 S | 9/2009 | Walters | |
| 2003/0080535 A1* | 5/2003 | Kurohori et al. | 280/638 |
| 2004/0245745 A1* | 12/2004 | Vasser | 280/282 |
| 2008/0007026 A1* | 1/2008 | Turner | 280/282 |
| 2010/0240464 A1* | 9/2010 | Schafer et al. | 464/182 |

* cited by examiner

*Primary Examiner* — Tony Winner
*Assistant Examiner* — Jacob Knutson

(57) ABSTRACT

The present invention features a low-rider tricycle kit for converting a standard bicycle to a low-rider tricycle. The kit contains a low-rider tricycle frame, a low-rider tricycle front fork assembly, a low-rider tricycle handlebar having a first grip and a second grip, a low-rider tricycle seat, and a low-rider tricycle front fender for substituting with a standard bicycle frame. The kit further includes a low-rider tricycle headlight assembly, a low-rider tricycle tail light assembly, a low-rider tricycle mirror, a double-rear-wheel axle assembly, a storage cavity, and a storage cart that attaches to and sets into the storage cavity of the double-rear-wheel axle assembly.

12 Claims, 6 Drawing Sheets

LOW-RIDER TRICYCLE KIT

BACKGROUND OF THE INVENTION

Bicycles were introduced in the 19th century. Throughout the years, however, there have been mechanical improvements as well as adaptations in design for a particular use of the bicycle, although the basic shape and configuration of the bicycle has not changed significantly. Because of the desire for self-expression, there is a need within many to take a common item such as a bicycle and modify it to represent of the taste and personality of the owner. The present invention addresses that need by teaching a low-rider tricycle kit that adapts to a standard bicycle enhancing its usefulness and style.

SUMMARY

The present invention features a low-rider tricycle kit for converting a standard bicycle to a low-rider tricycle. The kit contains a low-rider tricycle frame, a low-rider tricycle front fork assembly, a low-rider tricycle handlebar having a first grip and a second grip, a low-rider tricycle seat, and a low-rider tricycle front fender for substituting with a standard bicycle frame.

In some embodiments, the kit further includes a low-rider tricycle headlight assembly, a low-rider tricycle tail light assembly, a low-rider tricycle mirror, a double-rear-wheel axle assembly, a storage cavity, and a storage cart where the storage cart attaches to and sets into the storage cavity of the double-rear-wheel axle assembly.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
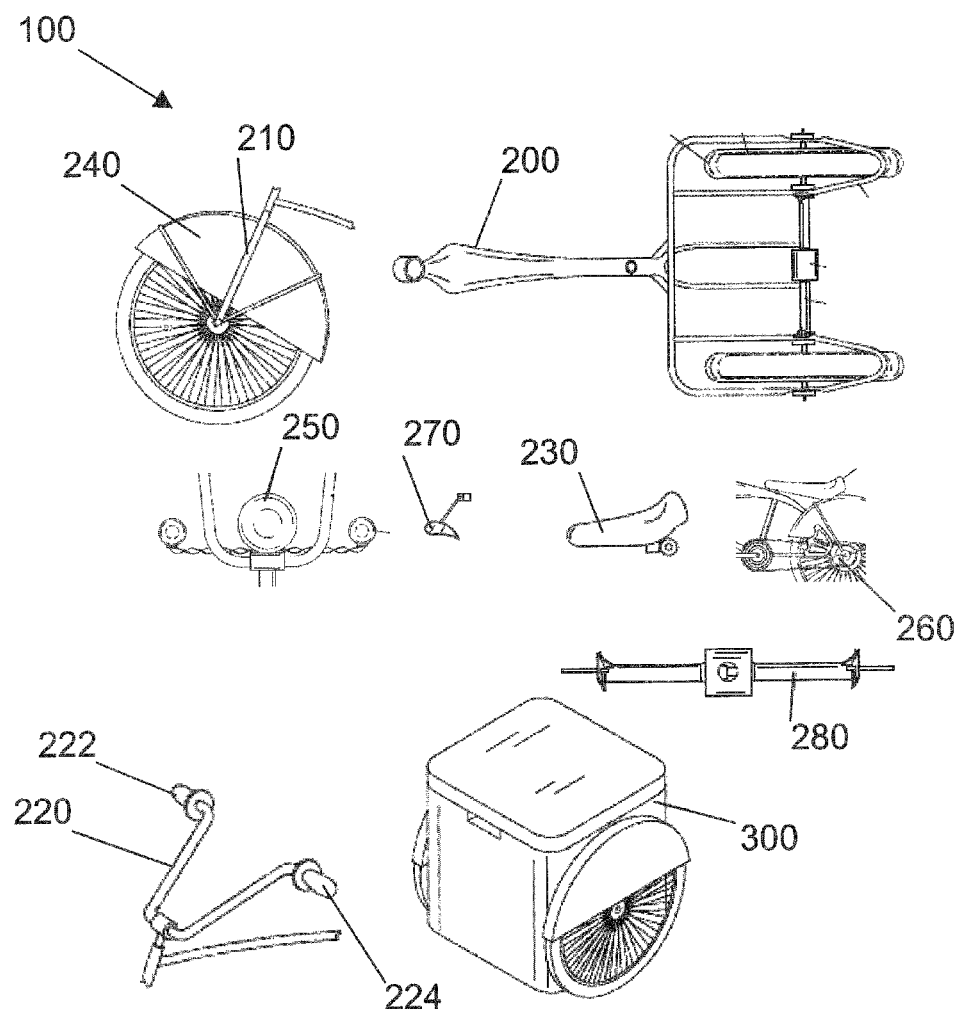
FIG. 1 is a view of the low-rider tricycle kit of the present invention.
Figure 2:
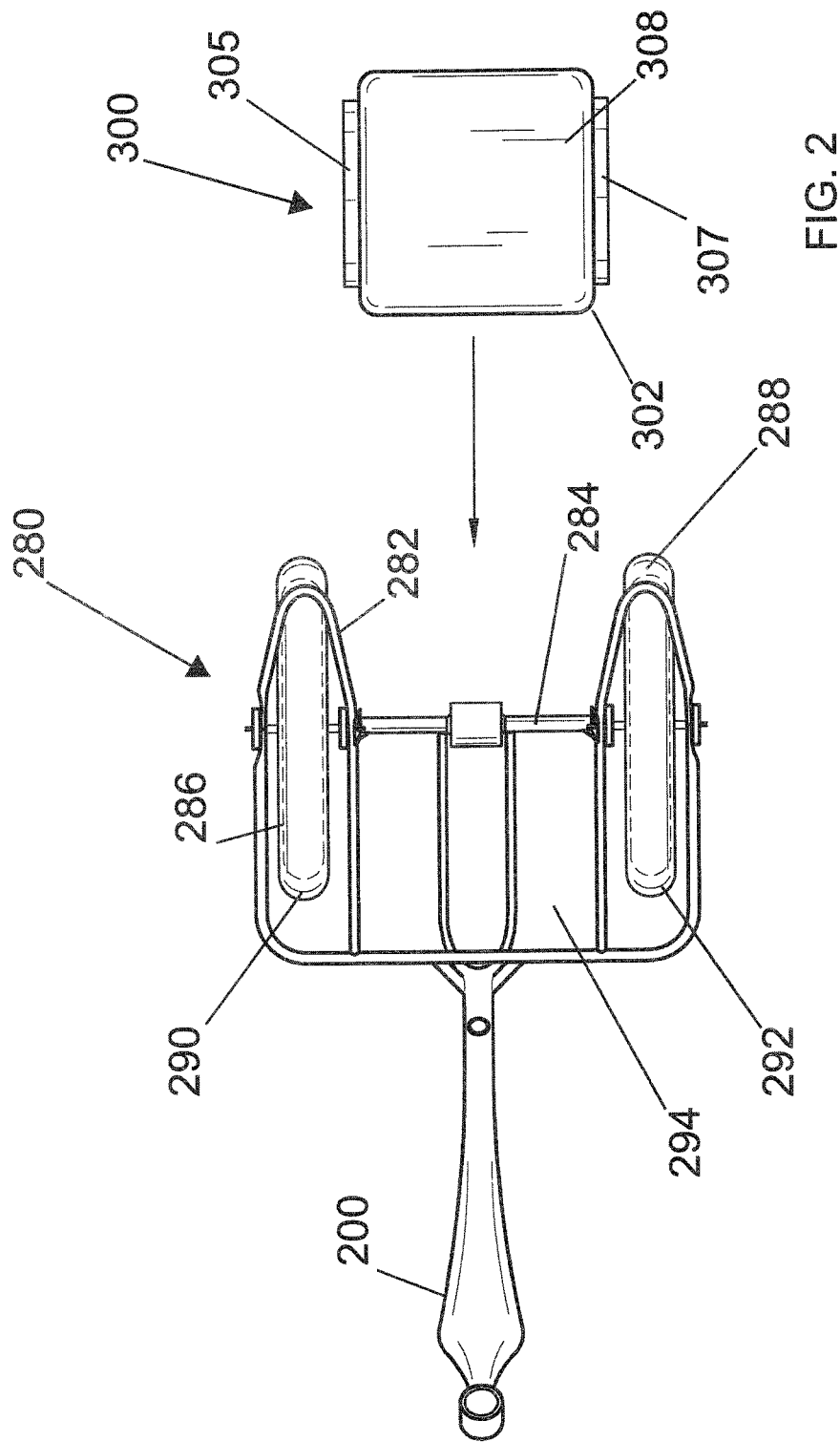
FIG. 2 is a view from above of the frame, the double-rear-wheel axle assembly, and the storage cart of the present invention.
Figure 3:
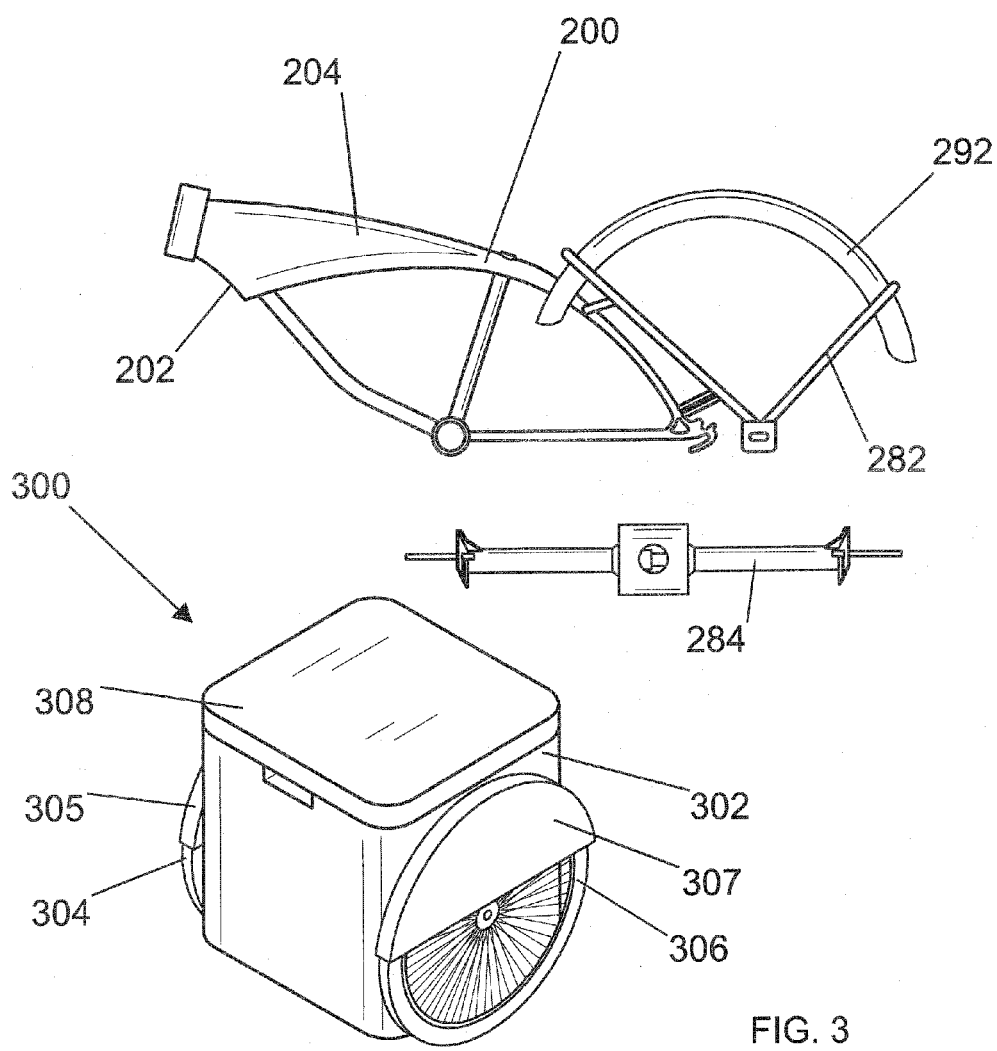
FIG. 3 is a side view of the frame, the axle and a perspective view of the storage cart of the present invention.
Figure 4:
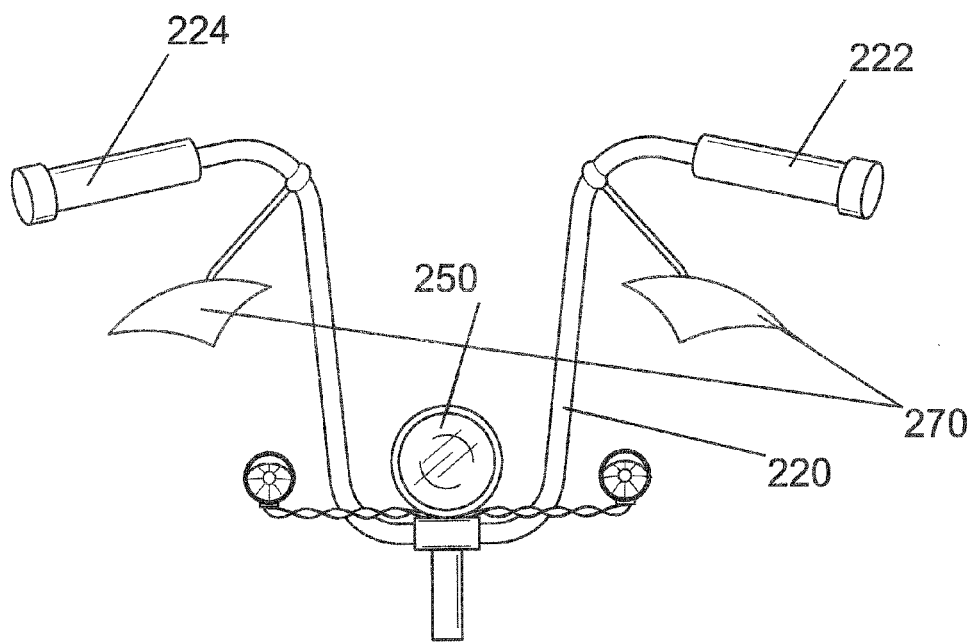
FIG. 4 is a front view of the handlebar of the present invention.
Figure 5:
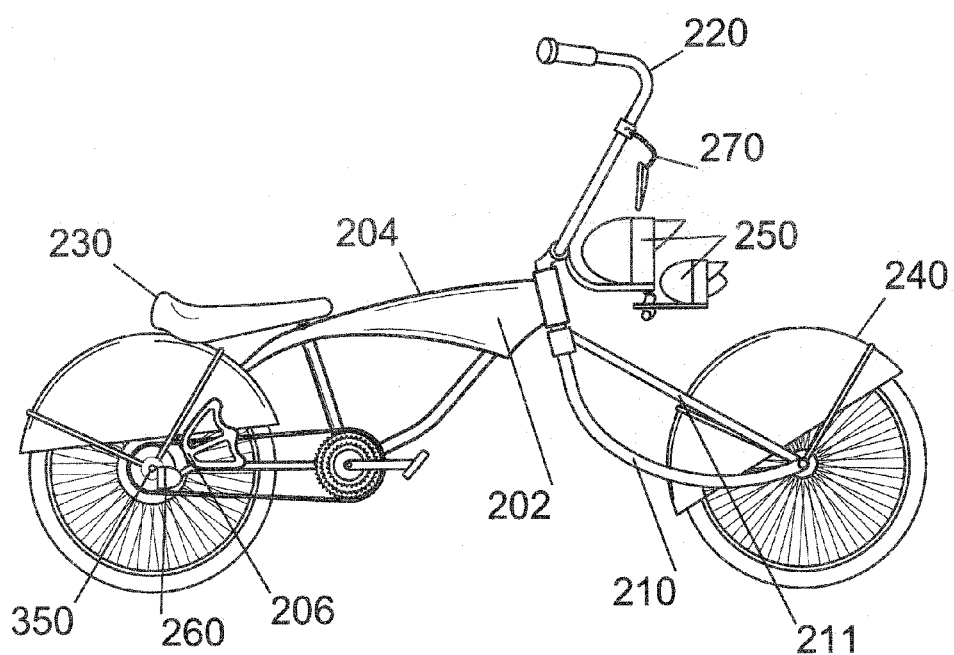
FIG. 5 is a side view of an alternate embodiment of the present invention with detail.
Figure 6:
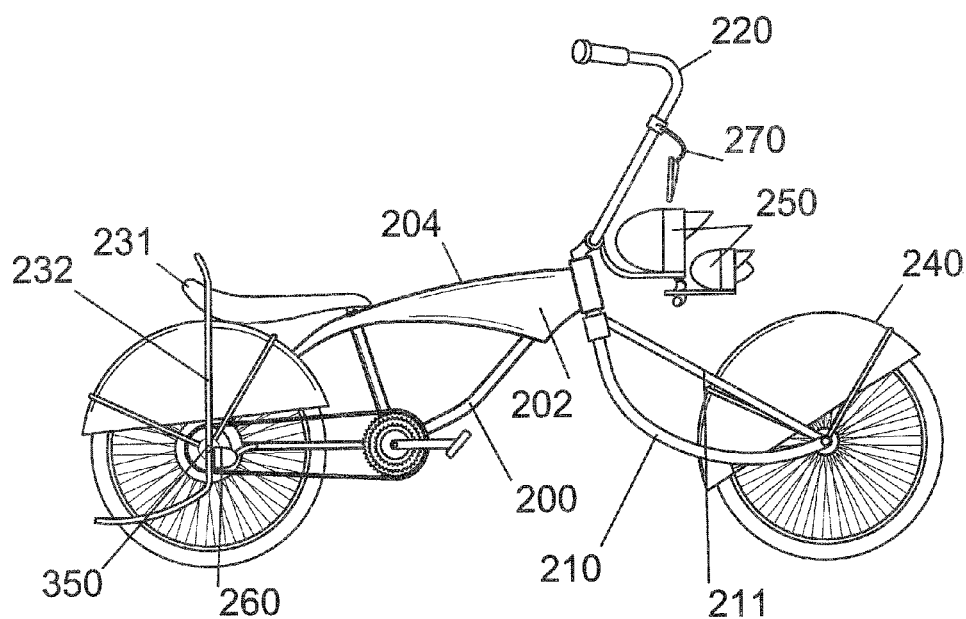
FIG. 6 is a side view of an alternate embodiment of the present invention with detail.

Following is a list of elements corresponding to a particular element referred to herein:
100 Low-rider tricycle kit
200 Low-rider tricycle frame
202 First side cover panel
204 Second side cover panel
206 Decorative gusset
210 Low-rider tricycle front fork assembly
211 Shock absorbing member
220 Low-rider tricycle handlebar
222 First grip
224 Second grip
230 Low-rider tricycle seat
231 Banana seat
232 Sissy bar
240 Low-rider tricycle front fender
250 Low-rider tricycle headlight assembly
260 Low-rider tricycle tail light assembly
270 Low-rider tricycle mirror
280 Double-rear-wheel axle assembly
282 Rear frame member
284 Rear axle
286 Rear first wheel
288 Rear second wheel
290 Rear first fender
292 Rear second fender
294 Storage cavity
300 Storage cart
302 Storage cart hollow container
304 Storage cart first wheel
305 Storage cart first fender
306 Storage cart second wheel
307 Storage cart second fender
308 Storage cart lid
350 Low-rider bicycle axle assembly Referring now to FIG. 1-6, the present invention features a low-rider tricycle kit (100) for converting a standard bicycle to a low-rider tricycle. In some embodiments, the low-rider tricycle kit contains components for substituting with the components on a standard bicycle including the following: a low-rider tricycle frame (200), a low-rider tricycle front fork assembly (210), a low-rider tricycle handlebar (220), a low-rider tricycle seat (230), and a low-rider tricycle front fender (240).

In some embodiments, the low-rider tricycle kit further contains components for addition to the standard bicycle including the following: a low-rider tricycle headlight assembly (250), a low-rider tricycle tail light assembly (260), and a low-rider tricycle mirror (270) for attaching to the low-rider tricycle handlebar (220).

In some embodiments, the low-rider tricycle kit further contains additional components for addition to the standard bicycle including the following: a double-rear-wheel axle assembly (280) that has a rear frame member (282), a rear axle (284), a rear first wheel (286), a rear second wheel (288), a rear first fender (290), a rear second fender (292), and a storage cavity (294). In some embodiments, the low-rider tricycle kit further contains a storage cart (300) with a storage cart hollow container (302) that removably attaches to and sets into the storage cavity (294).

In some embodiments, the storage cart first wheel (304) is located on a first side and the storage cart second wheel (306) located on a second side. The storage cart lid (308) is located on top. In some embodiments, the storage cart (300) removably attaches to and sets into the storage cavity (294) of the double-rear-wheel axle assembly (280).

In some embodiments, the frame (200) is constructed from a metal, for example, steel, stainless steel, titanium, or aluminium. In some embodiments, the frame (200) is constructed from a plastic. In some embodiments, the frame (200) is constructed from a composite, for example, fiberglass, or carbon fiber.

in some embodiments, the frame (200) further has a decorative gusset (206) located toward the bottom rear of the frame (200). In some embodiments, the decorative gusset (206) provides structural support. In some embodiments, the decorative gusset (206) is detachably removable. In some embodiments, the decorative gusset is constructed from a metal, for example, steel, stainless steel, titanium, or aluminium. In some embodiments, the decorative gusset is constructed from a plastic. In some embodiments, the decorative gusset is constructed form a composite, for example, fiberglass, or carbon fiber.

In some embodiments, the frame (200) is coated with a corrosion-resistant coating, for example, paint, or powder coating.

In some embodiments, the frame (200) is electroplated with a corrosion-resistant coating, for example, a chrome plating compound, a gold plating compound, a nickel plating compound, a copper plating compound, or a zinc plating compound.

In some embodiments, a low-rider tricycle frame (200) has a first side cover panel (202) located toward the top front of the first side of the frame (200) and a second side cover panel (204) located near the top front of the second side of the frame (200). In some embodiments, the first side cover panel (202) and the second side cover panel (204) are distinctly shaped as a styling aid for the frame (200). In some embodiments, the first side cover panel (202) and the second side cover panel (204) have the same shape as one another. In some embodiments, the first side cover panel (202) and the second side cover panel (204) are located toward the bottom of the frame (200). In some embodiments, the first side cover panel (202) and the second side cover panel (204) are located toward the front of the frame.

In some embodiments, the first side cover panel (202) and the second side cover panel (204) are comprised of a rigid material, for example, metal, wood or plastic.

In some embodiments, the low-rider tricycle front fork assembly (210) has a shock absorbing member (211).

In some embodiments, the low-rider tricycle handlebar (220) has a first grip (222) located on a first side and a second grip (224) located on a second side. In some embodiments, the first grip (222) and the second grip (224) are constructed from a rubber, or a silicone rubber. In some embodiments, the first grip (222) and the second grip (224) are constructed from a metal. In some embodiments, the first grip (222) and the second grip (224) are constructed from a plastic.

In some embodiments, the low-rider tricycle seat (230) has a sissy bar (232). In some embodiments, the sissy bar (232) is installed with a lower edge extending vertically below the seat, then having a bend at a 90 degree angle toward the rear simulating a motorcycle exhaust pipe. In some embodiments, the sissy bar (232) is installed extending vertically upward as a support for the back of a rider when sitting on the seat.

In some embodiments, the low-rider tricycle seat (230) is a banana seat (231).

In some embodiments, the low-rider tricycle seat (230) is located on the double-rear-wheel axle assembly (280).

In some embodiments, the low-rider tricycle front fender (240) fully encloses about a top ½ of a front wheel from the standard bicycle. In some embodiments, the low-rider tricycle front fender (240) fully encloses about a top ⅓ of a front wheel from the standard bicycle. In some embodiments, the low-rider tricycle front fender (240) fully encloses about a top ¼ of a front wheel from the standard bicycle. In some embodiments, the edge of the low-rider tricycle front fender (240) is parallel to a ground surface. In some embodiments, the edge of the low-rider tricycle front fender (240) is at an angle with respect to the ground surface. In some embodiments, the angle of the edge of the low-rider tricycle front fender (240) with respect to the ground is between 0 degrees and 60 degrees.

In some embodiments, the double-rear-wheel axle assembly (280) is located on the rear portion of the frame (200). In some embodiments, the double-rear-wheel axle assembly (280) has a rear frame member (282) and a rear axle (284) that mounts perpendicularly to the length component of the frame (200). In some embodiments, the double-rear-wheel axle assembly (280) has a rear first wheel (286) located on a first side and a rear second wheel (288) located on a second side, in some embodiments, the double-rear-wheel axle assembly (280) also has a rear first fender (290) located over the rear first wheel (286), and a rear second fender (292) located over the rear second wheel (288).

In some embodiments, the double-rear-wheel axle assembly also has a storage cavity (294) located between the rear first wheel (286) and the rear second wheel (288) that is sized to receive a storage cart (300). In some embodiments, the storage cart (300) has a storage cart hollow container (302), a storage cart first wheel (304) that is located on a first side, and the storage cart second wheel (306) located on a second side. In some embodiments, the storage cart lid (308) is located on top of the storage card hollow container (302). In some embodiments, the storage cart (300) removably attaches to and sets into the storage cavity (294) of the double-rear-wheel axle assembly (280). In some embodiments, the storage cart (300) is not detachably removable from the storage cavity (294).

In some embodiments, the storage cart (300) is insulated to retain heat or cold.

In some embodiments, the storage cart (300) has no wheels. In some embodiments, the storage cart (300) has three or more wheels.

In some embodiments, the storage cart (300) has a storage cart first fender (305) located on the storage cart first side above the storage cart first wheel (304), and a storage cart second fender (307) located on the storage cart second side above the storage cart second wheel (306).

In some embodiments, the double-rear-wheel axle assembly (280) is detachably removable for conversion of the low-rider tricycle to a single rear wheel low-rider bicycle. In some embodiments, the kit (100) of claim 1 further has a single rear wheel low-rider bicycle axle assembly (350), where the low-rider bicycle axle assembly (350) is operatively located on the rear of the low-rider tricycle frame (200) and the rear first wheel (286) is operatively located on the low-rider bicycle axle assembly (350).

In some embodiments, the low-rider tricycle headlight assembly (250) is for attaching to the low-rider tricycle handlebar (220). In some embodiments, the low-rider tricycle headlight assembly (250) has one or more headlights. In some embodiments, the low-rider headlight assembly (250) contains a power source.

In some embodiments, the low-rider tricycle tail light assembly (260) is for attaching to the low-rider tricycle frame (200). In some embodiments, the low-rider tail light assembly (260) contains a power source.

In some embodiments, the low-rider tricycle mirror (270) is for attaching to the low-rider tricycle handlebar (220). In some embodiments, a plurality of low-rider tricycle mirrors (270) is used.

As used herein, the term "about" refers to plus or minus 10% of the referenced number. For example, an embodiment wherein the low-rider tricycle front fender fully encloses about a top ½ of a front wheel from the standard bicycle includes a device that encloses between ⅖ and ⅗ of a front wheel from a standard bicycle.

The disclosures of the following U.S. patents are incorporated in their entirety by reference herein: U.S. Pat. No. 2,550,876; U.S. Pat. No. 3,063,735; U.S. Pat. No. 3,694,004; U.S. Design Pat. No. D200,040; U.S. Design Pat. No. D236,803; U.S. Design Pat. No. D308,499; and U.S. Design Pat. No. D600,596.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A low-rider tricycle kit (100) for converting a standard bicycle to a low-rider tricycle comprising:
   (a) a low-rider tricycle frame (200) for substituting with a standard bicycle frame having a first side cover panel (202) disposed toward a top front of a first side of the frame (200) and a second side cover panel (204) disposed near the top front of a second side of the frame (200);
   (b) a low-rider tricycle front fork assembly (210) for substituting with a standard bicycle front fork assembly;
   (c) a low-rider tricycle handlebar (220) having a first grip (222) disposed on the first side and a second grip (224) disposed on the second side for substituting with a standard bicycle handlebar;
   (d) a low-rider tricycle seat (230) for substituting with a standard bicycle seat;
   (e) a low-rider tricycle front fender (240) for substituting with a standard bicycle front fender;
   (f) a low-rider tricycle headlight assembly (250) for attaching to the low-rider tricycle handlebar (220);
   (g) a low-rider tricycle tail light assembly (260) for attaching to the low-rider tricycle frame (200);
   (h) a low-rider tricycle mirror (270) for attaching to the low-rider tricycle handlebar (220);
   (i) a double-rear-wheel axle assembly (280) having a rear frame member (282), a rear axle (284) having a rear first wheel (286) disposed on the first side and a rear second wheel (288) disposed on the second side, a rear first fender (290) disposed over the rear first wheel (286), a rear second fender (292) disposed over the rear second wheel (288), and a storage cavity (294) disposed between the rear first wheel (286) and the rear second wheel (288); and
   (j) a storage cart (300) having a storage cart hollow container (302), a storage cart first wheel (304) disposed on the first side, a storage cart second wheel (306) disposed on the second side, and a storage cart lid (308) disposed on top, wherein the storage cart (300) removably attaches to and sets into the storage cavity (294) of the double-rear-wheel axle assembly (280);
wherein the low-rider tricycle kit (100) is for converting a standard bicycle to a low-rider tricycle.

2. The kit of claim 1, wherein the frame (200) is constructed from a metal.

3. The kit of claim 1, wherein the frame (200) further comprises a decorative gusset (206) disposed toward a bottom rear of the frame (200).

4. The kit of claim 1, wherein the frame (200) is coated with a corrosion-resistant coating.

5. The kit of claim 1, wherein the frame (200) is electroplated with a corrosion-resistant coating.

6. The kit of claim 1, wherein the low-rider tricycle front fork assembly (210) comprises a shock absorbing member (211).

7. The kit of claim 1, wherein the low-rider tricycle seat (230) further comprises a sissy bar (232).

8. The kit of claim 1, wherein the low-rider tricycle seat (230) is a banana seat (231).

9. The kit of claim 1, wherein the low-rider tricycle seat (230) is disposed on the double-rear-wheel axle assembly (280).

10. The kit of claim 1, wherein the low-rider-tricycle front fender fully encloses about a top ½ of a front wheel from the standard bicycle.

11. The kit of claim 1, wherein the storage cart (300) is insulated to retain heat or cold.

12. The kit of claim 1, wherein the storage cart (300) further comprises a storage cart first fender (305) disposed on the storage cart first side and a storage cart second fender (307) disposed on the storage cart second side.

* * * * *